(12) United States Patent
Kawamura et al.

(10) Patent No.: US 9,001,638 B2
(45) Date of Patent: Apr. 7, 2015

(54) RADIO BASE STATION APPARATUS, MOBILE TERMINAL APPARATUS AND RADIO COMMUNICATION METHOD

(75) Inventors: Teruo Kawamura, Tokyo (JP); Yoshihisa Kishiyama, Tokyo (JP); Mamoru Sawahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 497 days.

(21) Appl. No.: 13/387,121

(22) PCT Filed: Jul. 29, 2010

(86) PCT No.: PCT/JP2010/062840
§ 371 (c)(1),
(2), (4) Date: Feb. 24, 2012

(87) PCT Pub. No.: WO2011/013770
PCT Pub. Date: Feb. 3, 2011

(65) Prior Publication Data
US 2012/0140725 A1    Jun. 7, 2012

(30) Foreign Application Priority Data
Jul. 31, 2009  (JP) ................................ 2009-178512

(51) Int. Cl.
*H04J 11/00* (2006.01)
*H04L 25/02* (2006.01)
*H04L 5/00* (2006.01)
*H04L 27/26* (2006.01)
*H04J 13/00* (2011.01)

(52) U.S. Cl.
CPC .......... *H04L 25/0226* (2013.01); *H04L 5/0048* (2013.01); *H04L 27/2613* (2013.01); *H04J 13/0059* (2013.01); *H04L 5/0053* (2013.01); *H04L 5/006* (2013.01)

(58) Field of Classification Search
None
See application file for complete search history.

(56) References Cited

U.S. PATENT DOCUMENTS

2008/0101488 A1* 5/2008 Wilhelmsson et al. ....... 375/260
2008/0181327 A1* 7/2008 Lee et al. ..................... 375/267
2014/0105189 A1* 4/2014 Papasakellariou et al. ... 370/336

FOREIGN PATENT DOCUMENTS

WO    2008/126617 A1    10/2008

OTHER PUBLICATIONS

International Search Report w/translation from PCT/JP2010/062840 dated Sep. 14, 2010 (2 pages).

(Continued)

*Primary Examiner* — Awet Haile
(74) *Attorney, Agent, or Firm* — Osha Liang LLP

(57) ABSTRACT

To enable an uplink control signal subjected to user multiplexing by an orthogonally multiplexing method using the cyclic shift to be user-demultiplexed, and further enable channel estimation accuracy to be improved, a radio communication method of the invention is characterized in that a mobile terminal apparatus provides a plurality of subcarriers with phase rotation amounts set to minimize the number of unit subcarriers for coherent averaging in association with the number of multiplexed users, and transmits an uplink control signal using the plurality of subcarriers provided with the phase rotation amounts, and that a radio base station apparatus receives the uplink control signal, performs coherent averaging on reference signal using the different number of unit subcarriers corresponding to the number of multiplexed users to demultiplex into a reference signal for each of the users, and estimates a channel variation using the demultiplexed reference signal.

12 Claims, 11 Drawing Sheets

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Notification of Reasons for Rejection for Japanese Application No. 2009-178512 dated Dec. 4, 2012, with English translation thereof (3 pages).

* cited by examiner

RADIO BASE STATION APPARATUS, MOBILE TERMINAL APPARATUS AND RADIO COMMUNICATION METHOD

TECHNICAL FIELD

The present invention relates to a radio base station apparatus, mobile terminal apparatus and radio communication method in the next-generation mobile communication system.

BACKGROUND ART

In UMTS (Universal Mobile Telecommunications System) networks, for the purpose of improving spectral efficiency, peak data rates, etc., by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing spectral efficiency and peak data rates, reducing delay and the like, Long Term Evolution (LTE) has been studied (Non-patent Document 1). In LTE, as distinct from W-CDMA, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

As shown in FIG. 1, signals transmitted in uplink are mapped to appropriate radio resources, and are transmitted from a mobile terminal apparatus to a radio base station apparatus. In this case, user data (UE (User Equipment) #1, UE #2) is assigned to the uplink shared channel (PUSCH: Physical Uplink Shared Channel), and control information is time-multiplexed with a data signal in the PUSCH when the control information is transmitted concurrently with the user data, while being assigned to the uplink control channel (PUCCH: Physical Uplink Control Channel) when only the control information is transmitted. The control information transmitted in uplink includes downlink quality information (CQI: Channel Quality Indicator, PMI: Precoding Matrix Indicator), retransmission response (ACK: Acknowledgement/NACK: Negative ACK) to the downlink shared channel, etc.

In the PUCCH, typically, different subframe structures are adopted between the case of transmitting CQI/PMI and the case of transmitting ACK/NACK (FIGS. 2(a), 2(b)). The subframe structure of the PUCCH is comprised of two slots, and one slot (½ subframe) contains 7 SC-FDMA symbols. Further, one SC-FDMA symbol contains 12 information symbols (subcarriers). More specifically, as shown in FIG. 2(a), in the subframe structure (CQI/PMI format) of CQI/PMI, a reference signal (RS) is multiplexed into a second symbol (#2) and sixth symbol (#6), and the control information (CQI/PMI) is multiplexed into the other symbols (first symbol, third to fifth symbols, seventh symbol) in a slot. Meanwhile, as shown in FIG. 2(b), in the subframe structure (ACK/NACK format) of ACK/NACK, a reference signal is multiplexed into third symbol (#3) to fifth sixth symbol (#5), and the control information (ACK/NACK) is multiplexed into the other symbols (first symbol (#1), second symbol (#2), sixth symbol (#6), seventh symbol (#7)) in a slot. In one subframe, the slot is repeated twice. Further, as shown in FIG. 1, the PUCCH is multiplexed into radio resources at opposite edges of the system band, and frequency hopping (Inter-slot FH) is applied between two slots having different frequency bands in one subframe.

When uplink control information of a plurality of users is multiplexed onto the PUCCH, the uplink control channel signals are orthogonally multiplexed so that the radio base station apparatus is capable of demultiplexing the uplink control channel signals for each user. As such an orthogonally multiplexing method, for example, there is an orthogonally multiplexing method using the cyclic shift of CAZAC (Constant Amplitude Zero Auto Correlation) code sequences.

The orthogonally multiplexing method using the cyclic shift of CAZAC code sequences is an orthogonally multiplexing method employing the fact that a sequence obtained by cyclically shifting a CAZAC code sequence with code length L by $\Delta p$ is mutually orthogonal to a sequence obtained by cyclically shifting the CAZAC code sequence with code length L by $\Delta q$. In this method, for example as shown in FIG. 3, for UE #p, a CAZAC code sequence with code length L is cyclically shifted by $\Delta p$, and for UE #q, the same CAZAC code sequence with code length L is cyclically shifted by $\Delta q$. Further, since signals are transmitted by modulating (block modulation) the entire single SC-FDMA symbol with control information, orthogonality of uplink control channel signals is maintained among users. In addition, the interval of the cyclic shift of the CAZAC code sequence assigned to the user is preferably set to be longer than the maximum delay amount of multipath.

Herein, the orthogonally multiplexing method using the cyclic shift will be specifically described.

FIG. 4(a) is a diagram illustrating the cyclic shift of the same CAZAC code sequence (transmission signal sequence) in the time domain, and FIG. 4(b) is a diagram illustrating the cyclic shift of the same CAZAC code sequence in the frequency domain. FIGS. 4(a) and 4(b) are in a uniquely corresponding relationship (Fourier transform pair).

FIG. 4(a) illustrates 12 information symbols $a_0$ to $a_{11}$ in a single SC-OFDM symbol in the time domain. Between UE #p and UE #q, the cyclic shift is given by two information symbols (sequences are shifted by positions of white arrows in FIG. 4(a).) Meanwhile, FIG. 4(b) illustrates 12 subcarriers $A_0$ to $A_{11}$ (transmission band) in the frequency domain. In FIG. 4(b), in the UE #p and UE #q, each subcarrier is provided with different phase rotation associated with the cyclic shift shown in FIG. 4(a) (the direction of the arrow in FIG. 4(b) shows the rotation direction of the phase.) Therefore, the radio base station apparatus receives an addition of signals of the UE #p and UE #q. Accordingly, for example in FIG. 4(b), by making signals of 12 subcarriers of the UE #p coherent and adding and averaging over 12 subcarriers $A_0$ to $A_{11}$ signal components of the UE #q are canceled, and only signal components of the UE #p are left. By this means, it is possible to orthogonalize signals between users and demultiplex. In addition, on the condition that the amplitude (power) of a signal of each subcarrier is the same, complete orthogonality between users is achieved.

CITATION LIST

Non-Patent Literature

[Non-patent Literature 1] 3GPP, TR25.912 (V7.1.0), "Feasibility study for Evolved UTRA and UTRAN", September 2006

SUMMARY OF THE INVENTION

Technical Problem

As described above, in the case where user multiplexing is performed by the orthogonally multiplexing method using the cyclic shift and uplink control signals are transmitted on the PUCCH, there is not any particular problem when a difference between the actual channel variation (solid line) and the coherent averaging value of 12 subcarriers is small in the transmission band as shown in FIG. 5(a), but when a difference ($D_1$) between the actual channel variation (solid line) and the coherent averaging value of 12 subcarriers is large as shown in FIG. 5(b), channel estimation accuracy degrades, remaining interference increases in demultiplexing for each user, the orthogonally multiplexing condition thereby deteriorates, and there are problems that it is not possible to demultiplex for each user and/or the reception quality deteriorates.

The present invention was made in view of such a respect, and it is an object of the invention to provide a radio base station apparatus, mobile terminal apparatus and radio communication method for enabling an uplink control signal subjected to user multiplexing by the orthogonally multiplexing method using the cyclic shift to be user-demultiplexed, and further enabling channel estimation accuracy to be improved.

Solution to Problem

A radio base station apparatus of the invention includes a receiving section configured to receive an uplink control signal including a reference signal and feedback control information transmitted with subcarriers provided with phase rotation amounts set to minimize the number of unit subcarriers for coherent averaging in association with the number of multiplexed users, a first user demultiplexing section configured to perform coherent averaging on the reference signal using the different number of unit subcarriers corresponding to the number of multiplexed users to demultiplex into a reference signal for each of the users, and a channel estimation section configured to estimate a channel variation using the demultiplexed reference signal.

A mobile terminal apparatus of the invention includes a cyclic shift section configured to provide a plurality of subcarriers with phase rotation amounts set to minimize the number of unit subcarriers for coherent averaging in association with the number of multiplexed users, and a transmitting section configured to transmit an uplink control signal using the plurality of subcarriers provided with the phase rotation amounts.

Technical Advantage of the Invention

According to the invention, a mobile terminal apparatus provides a plurality of subcarriers with phase rotation amounts set to minimize the number of unit subcarriers for coherent averaging in association with the number of multiplexed users, and transmits an uplink control signal using the plurality of subcarriers provided with the phase rotation amounts, and a radio base station apparatus receives the uplink control signal, performs coherent averaging on the reference signal using the different number of unit subcarriers corresponding to the number of multiplexed users to demultiplex into a reference signal for each of the users, estimates a channel variation using the demultiplexed reference signal, and therefore, is capable of performing user demultiplexing on the uplink control signal subjected to user multiplexing by the orthogonally multiplexing method using the cyclic shift, and also of improving channel estimation accuracy.

DESCRIPTION OF EMBODIMENTS

An Embodiment of the invention will specifically be described below with reference to accompanying drawings.

In the conventional orthogonally multiplexing method using the cyclic shift in the PUCCH, when a radio base station apparatus performs channel estimation, the radio base station calculates coherent averaging over a transmission band (12 subcarriers), and performs channel estimation using the averaging value. When coherent averaging is thus performed over the entire transmission band, as described above, in the case where the channel variation is large within the transmission band, a difference between the actual channel variation and the coherent averaging value is large, and channel estimation accuracy degrades.

Figure 1:
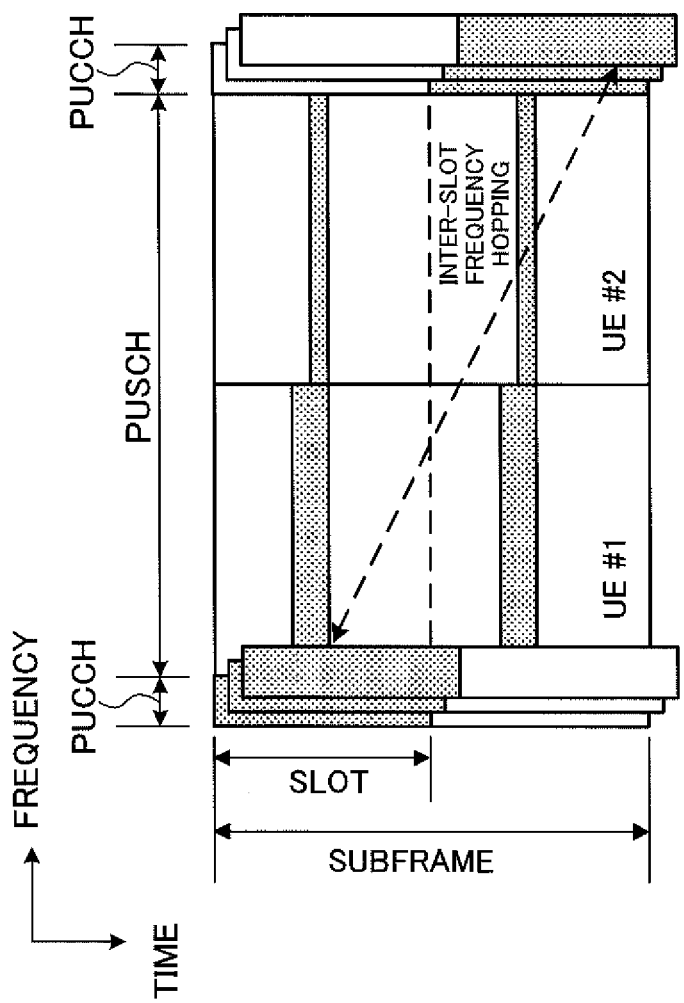
FIG. 1 is a diagram to explain a channel configuration to map signals in uplink.
Figure 2:
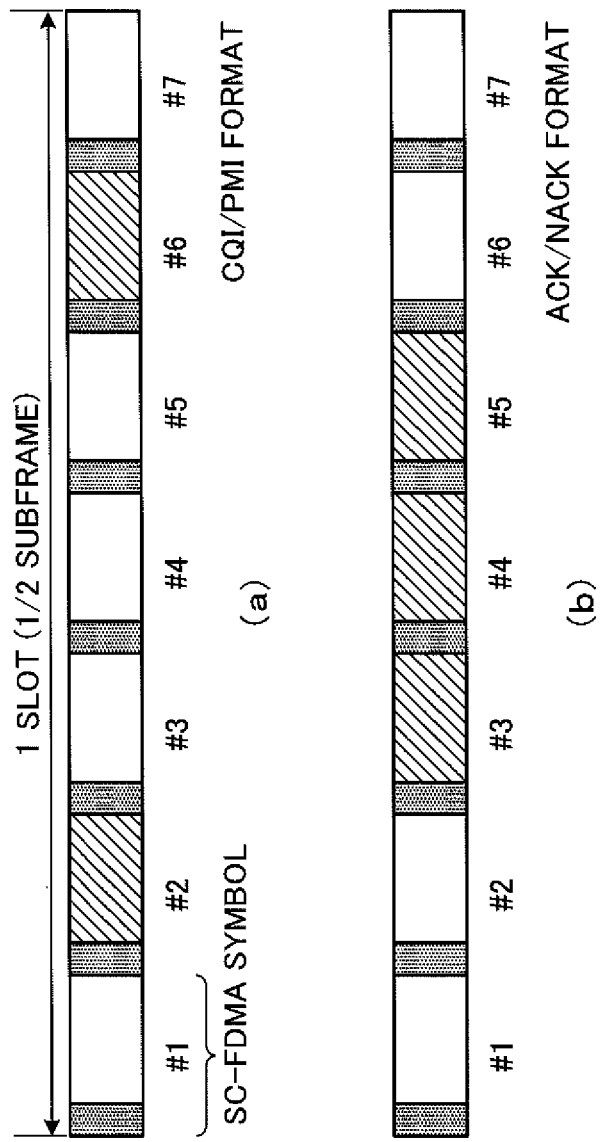
FIGS. 2(a) and 2(b) are diagrams to explain subframe configurations in uplink.
Figure 3:
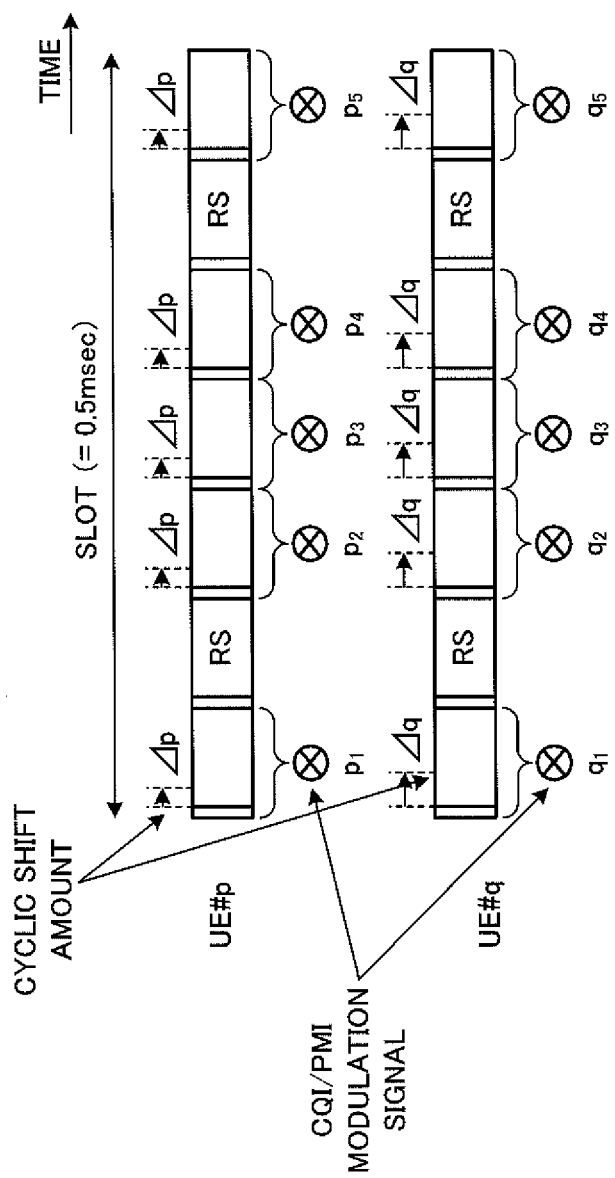
FIG. 3 is a diagram to explain an orthogonally multiplexing method by cyclic shift.
Figure 4:
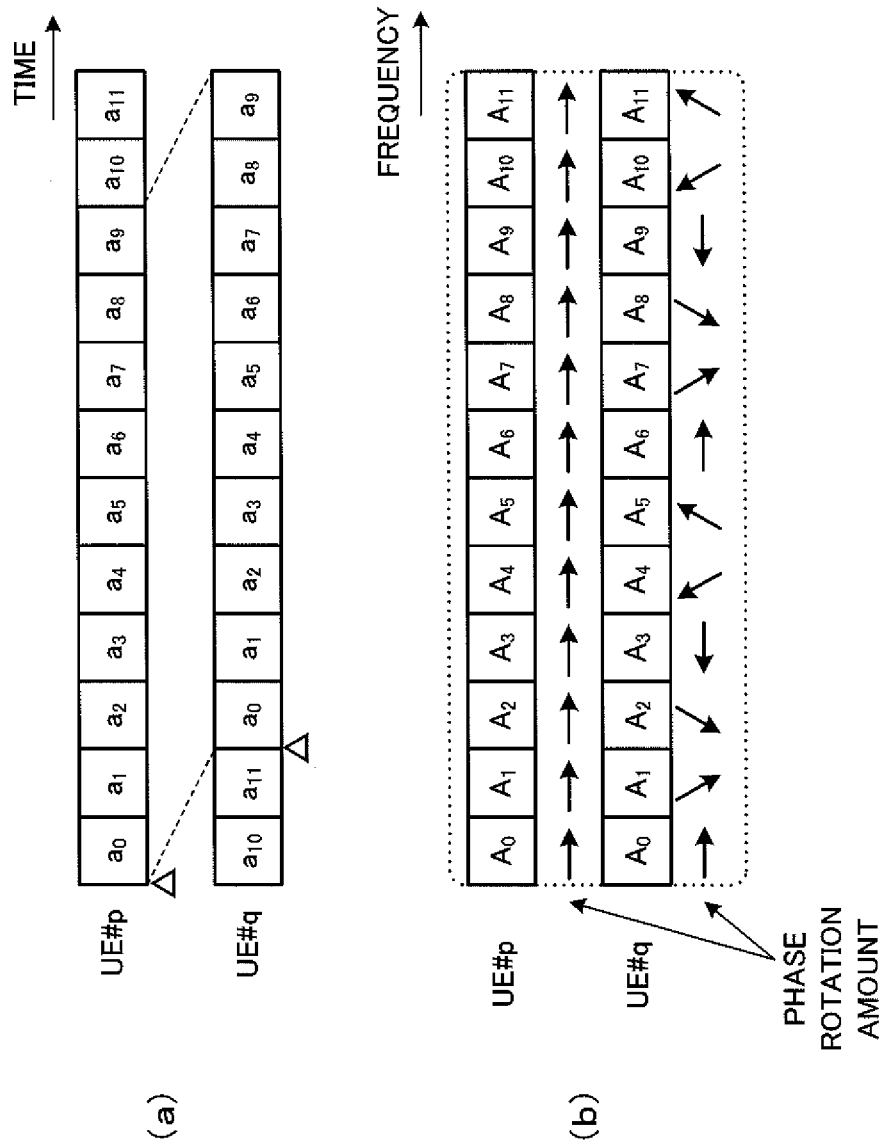
FIGS. 4(a) and 4(b) are diagrams to explain the orthogonally multiplexing method by cyclic shift.
Figure 5:
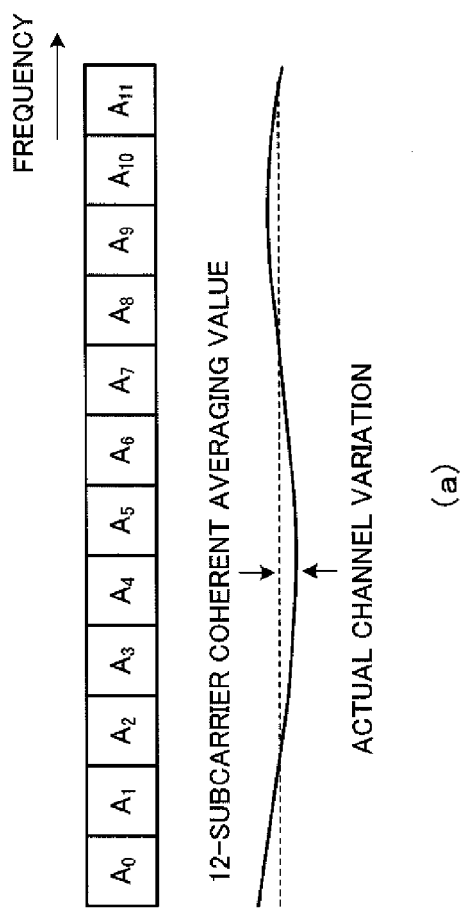
FIGS. 5(a) and 5(b) are diagrams to explain channel variations in the transmission band.
Figure 5:
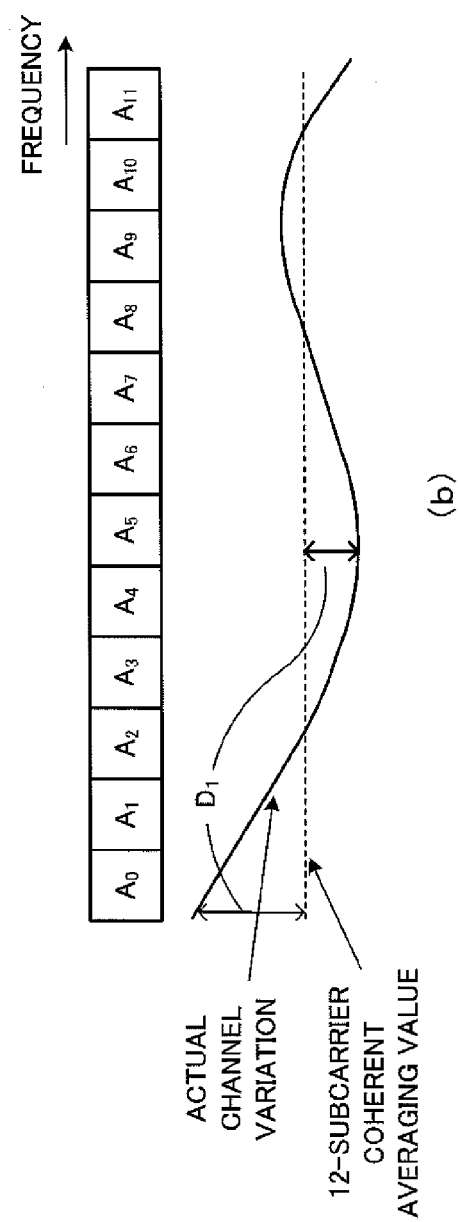
Figure 6:
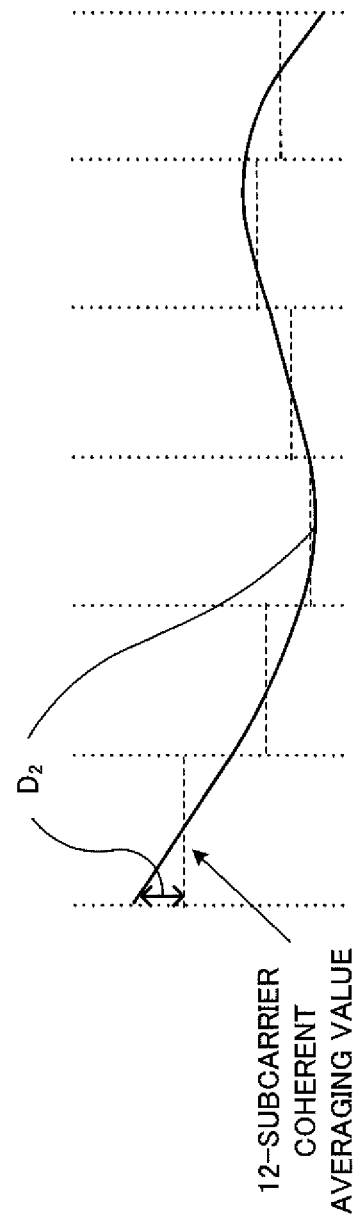
FIG. 6 is a diagram to explain an orthogonally multiplexing method by cyclic shift in a radio base station apparatus according to an Embodiment of the invention.

Therefore, as shown in FIG. 6, the inventor of the invention found out that when the radio base station apparatus performs channel estimation, minimizing the number of unit subcarriers for coherent averaging in association with the number of multiplexed users (two adjacent subcarriers in FIG. 6) allows the coherent averaging value to follow the actual channel variation i.e. allows to reduce a difference $D_2$ between the actual channel variation and the coherent averaging value, and arrived at the invention.

In other words, the gist of the invention is providing subcarriers with phase rotation amounts that minimize the number of unit subcarriers for coherent averaging in association with the number of multiplexed users, applying an orthogonally multiplexing method using the cyclic shift, and thereby enabling an uplink control signal subjected to user multiplexing by the orthogonally multiplexing method using the cyclic shift to be user-demultiplexed, and further enabling channel estimation accuracy to be improved.

In a radio communication method of the invention, a mobile terminal apparatus provides a plurality of subcarriers with phase rotation amounts set to minimize the number of unit subcarriers for coherent averaging in association with the number of multiplexed users, and transmits an uplink control signal including a reference signal, and a radio base station apparatus performs coherent averaging using the different number of unit subcarriers corresponding to the number of multiplexed users to demultiplex the reference signal into a reference signal for each of the users, and estimates a channel variation using the demultiplexed reference signal.

Herein, the description is given on providing a plurality of subcarriers with phase rotation amounts set to minimize the number of unit subcarriers for coherent averaging in association with the number of multiplexed users, and performing coherent averaging using the number of unit subcarriers to perform user demultiplexing.

FIG. 7(a) shows the case of multiplexing two users in the invention, and illustrates 12 information symbols $a_0$ to $a_{11}$ in one SC-OFDM symbol in the time domain. In FIG. 7(a), the cyclic shift corresponding to 6 information symbols is made between the UE #p and UE #q (shifted by positions of white arrows in FIG. 7(a)). In association therewith, FIG. 7(b) illustrates 12 subcarriers $A_0$ to $A_{11}$ (transmission band) in the frequency domain in the case of multiplexing two users in the invention. In FIG. 7(b), in the UE #p and UE #q, each subcarrier is provided with different phase rotation corresponding to the cyclic shift as shown in FIG. 7(a).

In the case as shown in FIG. 7(b), the number of users to orthogonally multiplex is "2" (UE #p and UE #q). In this case, since it is required to leave only signal components of one user (for example, UE #p in FIG. 7(b)), while canceling signal components of the other user (for example, UE #q in FIG. 7(b)), as shown in FIG. 7(b), phase rotation amounts are set so that phases are different between two adjacent subcarriers by 180° (at this point, the relationship between signals of two users in the time domain corresponds to the cyclic shift interval as shown in FIG. 7(a)). By thus setting the phase rotation amounts and performing coherent averaging over two adjacent subcarriers, in other words, by making two adjacent subcarriers $A_0 \sim A_1$, $A_2 \sim A_3$, $A_4 \sim A_5$, $A_6 \sim A_7$, $A_8 \sim A_9$, and $A_{10} \sim A_{11}$ of the UE #p coherent to perform averaging, it is possible to cancel signal components of the other user (UE #q in FIG. 7(b)). Further, similarly, by making two adjacent subcarriers $A_0 \sim A_1$, $A_2 \sim A_3$, $A_4 \sim A_5$, $A_6 \sim A_7$, $A_8 \sim A_9$, and $A_{10} \sim A_{11}$ of the UE #q coherent to perform averaging, it is possible to cancel signal components of the other user (UE #p in FIG. 7(b)). By this means, it is possible to demultiplex into users (UE #p and UE #q). Accordingly, in this case, the minimum number of unit subcarriers for coherent averaging is "2".

Thus, in the case where the number of multiplexed users is "2", the number of unit subcarriers for coherent averaging is set at "2", and the mobile terminal apparatus sets phase rotation amounts to add to subcarriers so that the radio base station apparatus is capable of performing user demultiplexing by performing coherent averaging over two subcarriers. Then, the radio base station apparatus performs coherent averaging over two adjacent subcarriers and performs user demultiplexing on uplink control signals.

FIG. 8(a) shows the case of multiplexing three users in the invention, and illustrates 12 information symbols $a_0$ to $a_{11}$ in one SC-OFDM symbol in the time domain. In FIG. 8(a), the cyclic shift corresponding to 4 information symbols is mutually made among the UE #p, UE #q and UE #r (shifted by positions of white arrows in FIG. 8(a)). In association therewith, FIG. 8(b) shows the case of multiplexing three users in the invention, and illustrates 12 subcarriers $A_0$ to $A_{11}$ (transmission band) in the frequency domain. In FIG. 8(b), in the UE #p, UE #q, and #UE r, each of subcarriers is provided with different phase rotation corresponding to the cyclic shift as shown in FIG. 8(a).

In the case as shown in FIG. 8(b), the number of users to orthogonally multiplex is "3" (UE #p, UE #q and UE #r). In this case, since it is required to leave only signal components of one user (for example, UE #p in FIG. 8(b)), while canceling signal components of the other users (for example, UE #q and UE #r in FIG. 8(b)), as shown in FIG. 8(b), phase rotation amounts are set so that phases are different from one another by 120° among three adjacent subcarriers (at this point, the relationship in signals of three users in the time domain corresponds to the cyclic shift interval as shown in FIG. 8(a)). By thus setting the phase rotation amounts and performing coherent averaging over three adjacent subcarriers, in other words, by making three adjacent subcarriers $A_0 \sim A_2$, $A_3 \sim A_5$, $A_6 \sim A_8$, and $A_9 \sim A_{11}$ of the UE #p coherent to perform averaging, it is possible to cancel signal components of the other users (UE #q and UE #r). Further, similarly, by making three adjacent subcarriers $A_0 \sim A_2$, $A_3 \sim A_5$, $A_6 \sim A_8$, and $A_9 \sim A_{11}$ of the UE #r coherent to perform averaging, it is possible to cancel signal components of the other users (UE #p and UE #q). By this means, it is possible to demultiplex into users (UE #p, UE #q, and UE #r). Accordingly, in this case, the minimum number of unit subcarriers for coherent averaging is "3".

Thus, in the case where the number of multiplexed users is "3", the number of unit subcarriers for coherent averaging is set at "3", and the mobile terminal apparatus sets phase rotation amounts to add to subcarriers so that the radio base station apparatus is capable of performing user demultiplexing by performing coherent averaging over three subcarriers. Then, the radio base station apparatus performs coherent averaging over three adjacent subcarriers and performs user demultiplexing on uplink control signals.

FIG. 9(a) shows the case of multiplexing six users in the invention, and illustrates 12 information symbols $a_0$ to $a_{11}$ in one SC-OFDM symbol in the time domain. In FIG. 9(a), the cyclic shift corresponding to 2 information symbols is mutually made among the UE #p, UE #q, UE #r, UE #s, UE #t and UE #u (shifted by positions of white arrows in FIG. 9(a)). In association therewith, FIG. 9(b) shows the case of multiplexing six users in the invention, and illustrates 12 subcarriers $A_0$ to $A_{11}$ (transmission band) in the frequency domain. In FIG. 9(b), in the UE #p, UE #q, #UE r, UE #s UE #t and UE #u, each of subcarriers is provided with different phase rotation corresponding to the cyclic shift as shown in FIG. 9(a).

In the case as shown in FIG. 9(b) the number of users to orthogonally multiplex is "6" (UE #p, UE #q UE #r UE #s, UE #t and UE #u). In this case, since it is required to leave only signal components of one user (for example, UE #p in FIG. 9(b)), while canceling signal components of the other users (for example, UE #q, UE #r UE #s, UE #t and UE #u in FIG. 9(b)), as shown in FIG. 9(b), phase rotation amounts are set so that phases are different from one another by 60° among six adjacent subcarriers (at this point, the relationship in signals of six users in the time domain corresponds to the cyclic shift interval as shown in FIG. 9(a)). By thus setting the phase rotation amounts and performing coherent averaging over six adjacent subcarriers, in other words, by making six adjacent subcarriers $A_0 \sim A_5$ and $A_6 \sim A_{11}$ of the UE #p coherent to perform averaging, it is possible to cancel signal components of the other users (UE #q, UE #r, UE #s, UE #t and UE #u). Further, similarly, by making six adjacent subcarriers $A_0 \sim A_5$ and $A_6 \sim A_{11}$ of the UE #q coherent to perform averaging, it is possible to cancel signal components of the other users (UE #p, UE #r, UE #s, UE #t and UE #u). Furthermore, similarly, by making six adjacent subcarriers $A_0$~$A_5$ and $A_6$~$A_{11}$ of the UE #r coherent to perform averaging, it is possible to cancel signal components of the other users (UE #p, UE #q, UE #s, UE #t and UE #u). Still furthermore, similarly, by making six adjacent subcarriers $A_0$~$A_5$ and $A_6$~$A_{11}$ of the UE #s coherent to perform averaging, it is possible to cancel signal components of the other users (UE #p, UE #q, UE #r, UE #t and UE #u). Moreover, similarly, by making six adjacent subcarriers $A_0$~$A_5$ and $A_6$~$A_{11}$ of the UE #t coherent to perform averaging, it is possible to cancel signal components of the other users (UE #p, UE #q, UE #r, UE #s and UE #u). Further, similarly, by making six adjacent subcarriers $A_0$~$A_5$ and $A_6$~$A_{11}$ of the UE #u coherent to perform averaging, it is possible to cancel signal components of the other users (UE #p, UE #q, UE #r, UE #s and UE #t). By this means, it is possible to demultiplex into users (UE #p, UE #q, UE #r, UE #s, UE #t, and UE #u). Accordingly, in this case, the minimum number of unit subcarriers for coherent averaging is "6".

Thus, in the case where the number of multiplexed users is "6", the number of unit subcarriers for coherent averaging is set at "6", and the mobile terminal apparatus sets phase rotation amounts to add to subcarriers so that the radio base station apparatus is capable of performing user demultiplexing by performing coherent averaging over six subcarriers. Then, the radio base station apparatus performs coherent averaging over six adjacent subcarriers and performs user demultiplexing on uplink control signals. In addition, also in the case where the number of multiplexed users is "4" or "5", the mobile terminal apparatus sets phase rotation amounts to add to subcarriers so that the radio base station apparatus is capable of performing user demultiplexing by performing coherent averaging over six subcarriers. Then, the radio base station apparatus performs coherent averaging over six adjacent subcarriers and performs user demultiplexing on uplink control signals.

In addition, in the case where the number of multiplexed users is "4" to "6", the number of subcarriers is simply "6", coherent averaging is performed over the number of subcarriers that is a half of 12 subcarriers, and therefore, when a channel variation is large in the transmission band, it is conceivable that it is not possible to follow the channel variation. In such a case, the positions of six adjacent subcarriers may be slid every one subcarrier to perform coherent averaging over a plurality of times. In other words, it may be considered making six adjacent subcarriers $A_0$~$A_5$ of the UE #p coherent to perform averaging, then making six adjacent subcarriers $A_1$~$A_6$ of the UE #p coherent to perform averaging, then making six adjacent subcarriers $A_2$~$A_7$ of the UE #p coherent to perform averaging, and thereafter, similarly, making six adjacent subcarriers $A_3$~$A_8$, $A_4$~$A_9$, $A_5$~$A_{10}$ and $A_6$~$A_{11}$ of the UE #p coherent to perform averaging.

Further, in the case where the number of users is "2" or the number of users is "3", similarly, the positions of two adjacent subcarriers or the positions of three adjacent subcarriers may be slid every one subcarrier to perform coherent averaging over a plurality of times.

By performing in this way, even when the channel variation is large in the transmission band, it is possible to reduce the difference between the actual channel variation and the coherent averaging value, and it is possible to enhance channel estimation accuracy. Further, it is possible to prevent increases in remaining interference that remains in demultiplexing user-multiplexed signal. By this means, it is possible to maintain orthogonality in orthogonalization between users at a high degree.

The radio communication method according to the invention will specifically be described below. In the following description, the case is described where a CQI/PMI signal is feedback control information included in an uplink control signal such that signals of users are orthogonally multiplexed by the cyclic shift.

Figure 10:
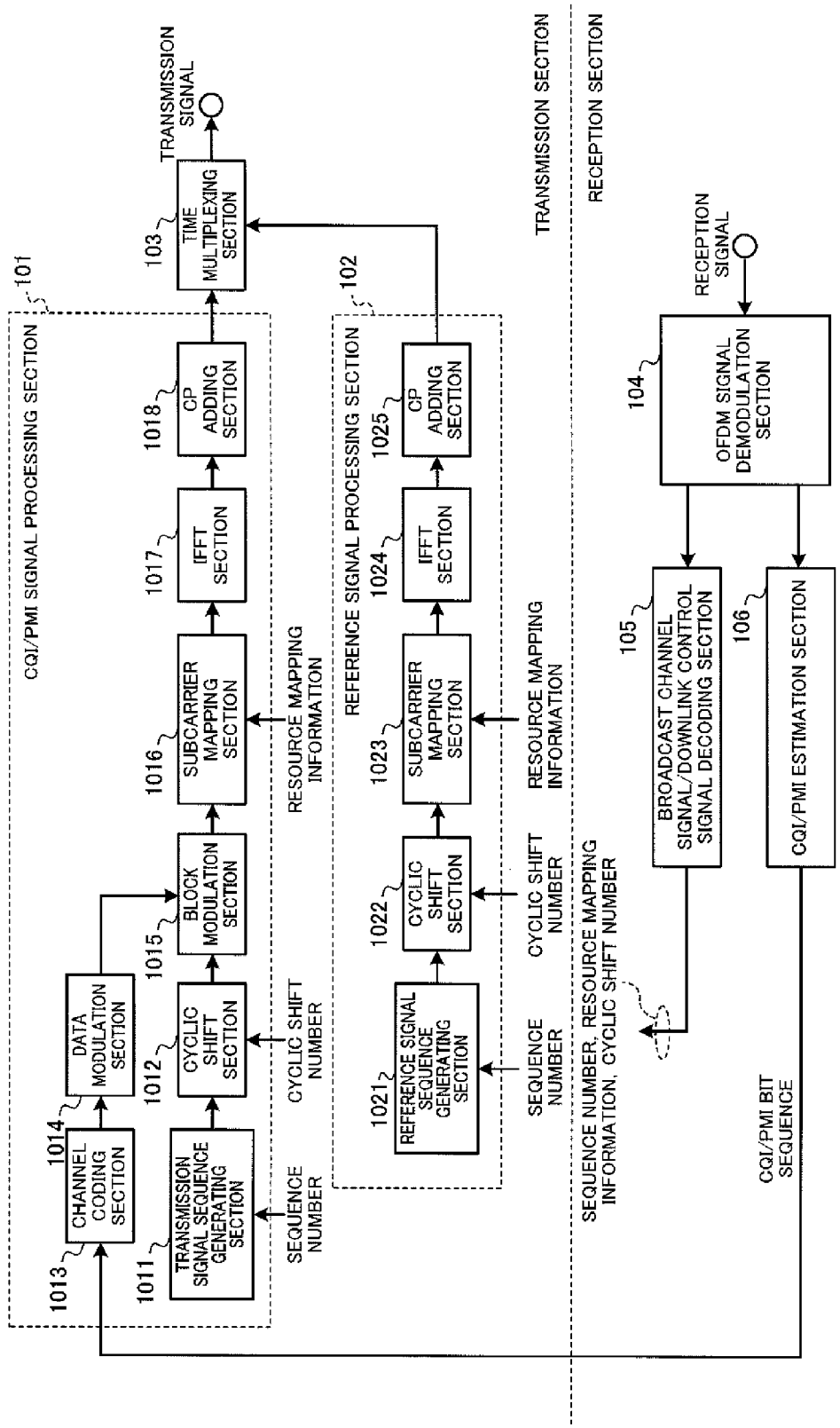
FIG. 10 is a diagram illustrating a schematic configuration of a mobile terminal apparatus according to the Embodiment of the invention.

FIG. 10 is a diagram illustrating a schematic configuration of the mobile terminal apparatus according to the Embodiment of the invention. The mobile terminal apparatus as shown in FIG. 10 is provided with a transmission section and a reception section. The transmission section is provided with a CQI/PMI signal processing section 101, reference signal processing section 102, and time multiplexing section 103 that time-multiplexes a CQI/PMI signal and a reference signal.

The CQI/PMI signal processing section 101 has a transmission signal sequence generating section 1011 that generates a transmission signal sequence associated with a sequence number, a cyclic shift section 1012 that cyclically shifts the transmission signal sequence, a channel coding section 1013 that performs error correcting coding on a CQI/PMI bit sequence generated in a CQI/PMI estimation section 106, described later, a data modulation section 1014 that performs data modulation on a coded signal, a block modulation section 1015 that performs block modulation on the transmission signal sequence with the signal subjected to data modulation, a subcarrier mapping section 1016 that maps the signal subjected to block modulation to subcarriers, an IFFT (Inverse Fast Fourier Transform) section 1017 that performs IFFT on the mapped signal, and a CP (Cyclic Prefix) adding section 1018 that adds a CP to the signal subjected to IFFT.

The reference signal processing section 102 has a reference signal sequence generating section 1021 that generates a reference signal sequence associated with a sequence number, a cyclic shift section 1022 that cyclically shifts the reference signal sequence, a subcarrier mapping section 1023 that maps the cyclically-shifted signal to subcarriers, an IFFT section 1024 that performs IFFT on the mapped signal, and a CP adding section 1025 that adds a CP to the signal subjected to IFFT.

The mobile terminal apparatus receives a downlink signal including reference signals. Then, the CQI/PMI estimation section 106, described later, estimates channel quality within the downlink transmission band using the reference signals, and generates a CQI/PMI bit sequence corresponding to the channel quality. The channel coding section 1013 in the CQI/PMI signal processing section 101 performs error correcting coding on the CQI/PMI bit sequence. The channel coding section 1013 outputs the channel-coded signal to the data modulation section 1014. The data modulation section 1014 modulates the coded bit sequence to signals of polar-coordinate components. The data modulation section 1014 outputs the data-modulated signal to the block modulation section 1015. The transmission signal sequence generating section 1011 generates a transmission signal sequence associated with a sequence number assigned to the user. The transmission signal sequence generating section 1011 outputs the transmission signal sequence to the cyclic shift section 1012.

The cyclic shift section 1012 provides a plurality of subcarriers with phase rotation amounts set to minimize the number of unit subcarriers for coherent averaging in associated with the number of multiplexed users. The cyclic shift section 1012 cyclically shifts the transmission signal sequence in the time domain by a predetermined cyclic shift amount as shown in FIGS. 7(a), 8(a), and 9(a). In other words, the cyclic shift section 1012 provides the transmission signal sequence in the frequency domain with a predetermined phase rotation amount as shown in FIGS. 7(b), 8(b), and 9(b). In addition, the cyclic shift amount varies with users, and is associated with the cyclic shift number.

For example, in the case where the number of multiplexed users is "2", as shown in FIG. 7(b), the phase rotation amount to add to subcarriers is set so that the radio base station apparatus performs coherent averaging over two subcarriers and is thereby capable of performing user demultiplexing. Meanwhile, in the case where the number of multiplexed users is "3", as shown in FIG. 8(b), the phase rotation amount to add to subcarriers is set so that the radio base station apparatus performs coherent averaging over three subcarriers and is thereby capable of performing user demultiplexing. Further, in the case where the number of multiplexed users is "4" to "6", as shown in FIG. 9(b), the phase rotation amount to add to subcarriers is set so that the radio base station apparatus performs coherent averaging over six subcarriers and is thereby capable of performing user demultiplexing. The cyclic shift section 1012 outputs the cyclically-shifted signal to the block modulation section 1015.

The block modulation section 1015 performs block modulation on the transmission signal sequence with the data-modulated control signal (CQI/PMI) on a block-by-block basis corresponding to 1 SC-FDMA. In other words, the section 1015 performs processing for multiplying all the transmission signal sequences by the same data-modulated symbol. The block modulation section 1015 outputs the block-modulated signal to the subcarrier mapping section 1016. The subcarrier mapping section 1016 maps the block-modulated signal to subcarriers based on resource mapping information.

The subcarrier mapping section 1016 outputs the subcarrier-mapped signal to the IFFT section 1017. The IFFT section 1017 performs IFFT on the subcarrier-mapped signal to transform into the signal in the time domain. The IFFT section 1017 outputs the IFFT-processed signal to the CP adding section 1018. The CP adding section 1018 adds a CP to the IFFT-processed signal. The CP adding section 1018 outputs the CP-added signal to the time multiplexing section 103.

The reference signal sequence generating section 1021 of the reference signal processing section 102 generates a reference signal sequence associated with a sequence number and uses as a reference signal. The reference signal sequence generating section 1021 outputs the reference signal to the cyclic shift section 1022.

The cyclic shift section 1022 provides a plurality of subcarriers with phase rotation amounts set to minimize the number of unit subcarriers for coherent averaging in associated with the number of multiplexed users. The cyclic shift section 1022 cyclically shifts the transmission signal sequence in the time domain by a predetermined cyclic shift amount as shown in FIGS. 7(a), 8(a) and 9(a). In other words, the cyclic shift section 1022 provides the transmission signal sequence in the frequency domain with a predetermined phase rotation amount as shown in FIGS. 7(b), 8(b), and 9(b). In addition, the cyclic shift amount varies with users, and is associated with the cyclic shift number.

For example, in the case where the number of multiplexed users is "2", as shown in FIG. 7(b), the phase rotation amount to add to subcarriers is set so that the radio base station apparatus performs coherent averaging over two subcarriers and is thereby capable of performing user demultiplexing. Meanwhile, in the case where the number of multiplexed users is "3", as shown in FIG. 8(b), the phase rotation amount to add to subcarriers is set so that the radio base station apparatus performs coherent averaging over three subcarriers and is thereby capable of performing user demultiplexing. Further, in the case where the number of multiplexed users is "4" to "6", as shown in FIG. 9(b) the phase rotation amount to add to subcarriers is set so that the radio base station apparatus performs coherent averaging over six subcarriers and is thereby capable of performing user demultiplexing. The cyclic shift section 1022 outputs the cyclically-shifted signal to the subcarrier mapping section 1023.

The subcarrier mapping section 1023 maps the signal in the frequency domain to subcarriers based on the resource mapping information. The subcarrier mapping section 1023 outputs the mapped reference signal to the IFFT section 1024. The IFFT section 1024 performs IFFT on the mapped signal to transform into the signal in the time domain. The IFFT section 1024 outputs the IFFT-processed reference signal to the CP adding section 1025. The CP adding section 1025 adds a CP to the IFFT-processed reference signal. The CP adding section 1025 outputs the CP-added reference signal to the time multiplexing section 103.

The time multiplexing section 103 time-multiplexes the signal from the CQI/PMI signal processing section 101 and the reference signal from the reference signal processing section 102 to be a transmission signal including an uplink control channel signal. By this means, the uplink control signal including the reference signal and the CQI/PMI signal that is feedback control information is transmitted to the radio base station apparatus using a plurality of subcarriers provided with phase rotation amounts.

The reception section has an OFDM signal demodulation section 104 that demodulates an OFDM signal transmitted from the radio base station apparatus, a broadcast channel signal/downlink control signal decoding section 105 that decodes a broadcast channel (BCH: Broadcast Channel) signal and a downlink control signal, and a CQI/PMI estimation section 106 that estimates CQI/PMI using the reference signal included in the downlink signal.

The OFDM signal demodulation section 104 receives a downlink OFDM signal to demodulate. In other words, the section 104 removes the CP from the downlink OFDM signal, performs Fast Fourier Transform, extracts subcarriers assigned a BCH signal or downlink control signal, and performs data demodulation. The OFDM signal demodulation section 104 outputs the data-demodulated signal to the BCH signal/downlink control signal decoding section 105. Further, the OFDM signal demodulation section 104 outputs the reference signal to the CQI/PMI estimation section 106.

The BCH signal/downlink control signal decoding section 105 decodes the data-demodulated signal, and obtains the sequence number, resource mapping information (including resource block numbers) and the cyclic shift number. The BCH signal/downlink control signal decoding section 105 outputs the sequence number to the transmission signal sequence generating section 1011 and reference signal generating section 1021, outputs the resource mapping information to the subcarrier mapping sections 1016, 1023, and outputs the cyclic shift number to the cyclic shift sections 1012, 1022.

The CQI/PMI estimation section 106 estimates channel quality within the transmission band using the reference signal, estimates the CQI used in scheduling, adaptive radio link control (AMC: Adaptive Modulation and Coding) and the like in the radio base station apparatus and the PMI used in MIMO transmission, and generates a CQI/PMI bit sequence. The CQI/PMI estimation section 106 outputs the CQI/PMI bit sequence to the channel coding section 1013.

Figure 11:
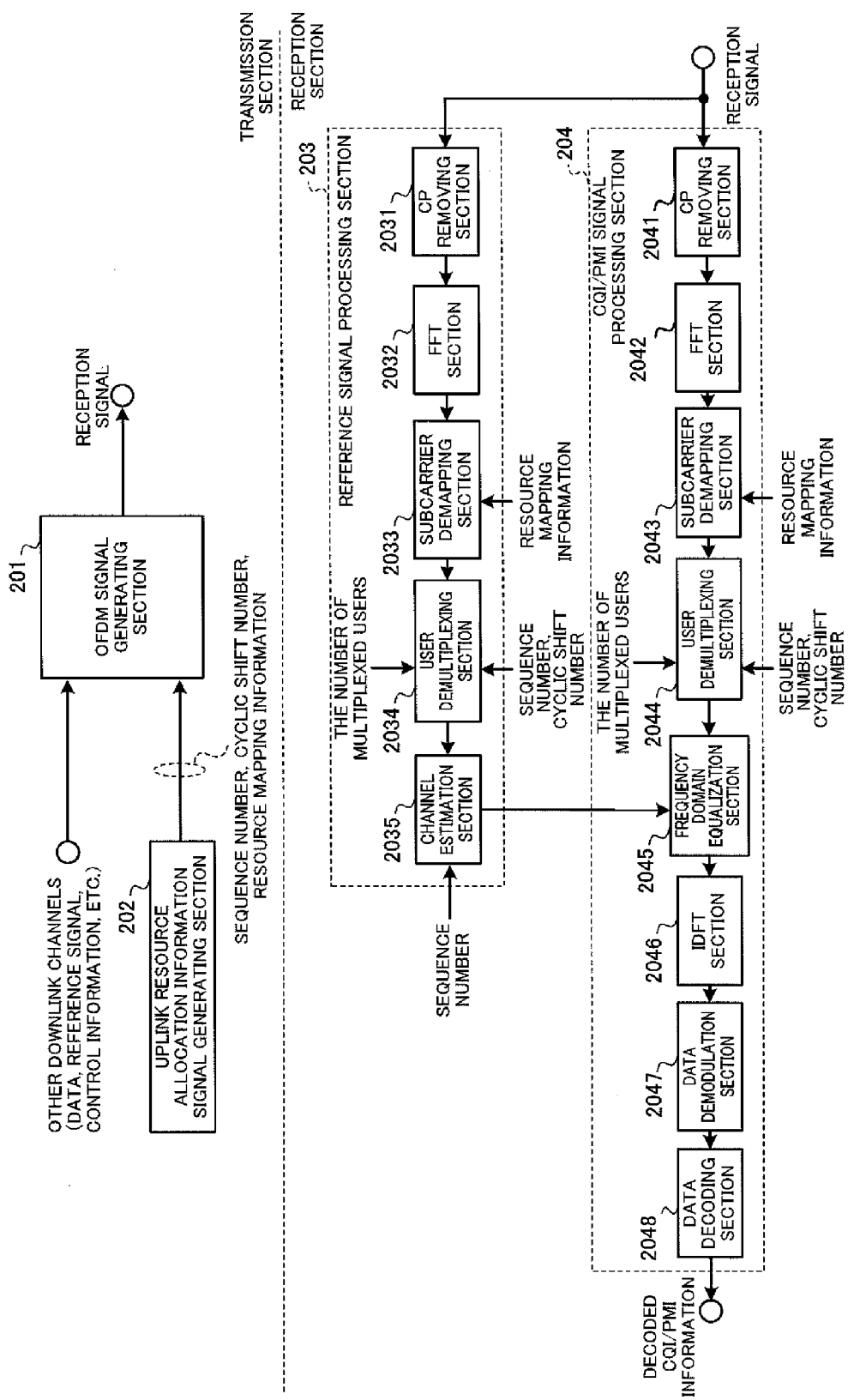
FIG. 11 is a diagram illustrating a schematic configuration of the radio base station apparatus according to the Embodiment of the invention.

FIG. 11 is a diagram illustrating a schematic configuration of the radio base station apparatus according to the Embodiment of the invention. The radio base station apparatus as shown in FIG. 11 is provided with a transmission section and a reception section. The transmission section has an uplink resource allocation information generating section 202, and an OFDM signal generating section 201 that multiplexes other downlink channel signals and uplink resource allocation information signal to generate an OFDM signal. The other downlink channel signals include data, reference signal, control signal, etc. and the uplink resource allocation information signal includes the sequence number, resource mapping information and the cyclic shift number.

In addition, the sequence number, the resource mapping information and the cyclic shift number may be transmitted to the mobile terminal apparatus on the BCH, or may be transmitted to the mobile terminal apparatus on the downlink control channel (PDCCH: Physical Downlink Control Channel). Alternatively, the sequence number, the resource mapping information and the cyclic shift number may be notified to the mobile terminal apparatus by a higher layer.

With respect to the downlink signal including the other downlink channel signals and uplink resource allocation information signal, the OFDM signal generating section 201 maps the signal to subcarriers, performs Inverse Fast Fourier Transform (IFFT), adds a CP, and thereby generates a downlink transmission signal.

The reception section is provided with a reference signal processing section 203, and CQI/PMI signal processing section 204. The reception section receives an uplink control signal including the reference signal and feedback control information (CQI/PMI signal) which is transmitted with subcarriers provided with phase rotation amounts set to minimize the number of unit subcarriers for coherent averaging in association with the number of multiplexed users.

The reference signal processing section 203 has a CP removing section 2031 that removes the CP from a reception signal, an FFT (Fast Fourier Transform) section 2032 that performs FFT on the CP-removed reception signal, a subcarrier demapping section 2033 that demaps the FFT-processed signal, a user demultiplexing section 2034 that performs coherent averaging using the different number of unit subcarriers corresponding to the number of multiplexed users to demultiplex into reference signals for each user, and a channel estimation section 2035 that estimates variation amounts (channel variation) of the phase and amplitude received in the propagation path using the user-demultiplexed reference signal.

The CQI/PMI signal processing section 204 has a CP removing section 2041 that removes the CP from a reception signal, an FFT section 2042 that performs FFT on the CP-removed reception signal, a subcarrier demapping section 2043 that demaps the FFT-processed signal, a user demultiplexing section 2044 that performs coherent averaging using the different number of unit subcarriers corresponding to the number of multiplexed users to demultiplex into feedback control information (CQI/PMI signal) for each user, a frequency domain equalization section 2045 that compensates the user-demultiplexed CQI/PMI signal for the channel variation, an IDFT (Inverse Discrete Fourier Transform) section 2046 that performs IDFT on the signal compensated for the channel variation, a data demodulation section 2047 that performs data demodulation on the IDFT-processed signal, and a data decoding section 2048 that performs data decoding on the signal subjected to data demodulation.

With respect to the reference signal, the CP removing section 2031 in the reference signal processing section 203 removes a portion corresponding to the CP from the reception signal, and extracts an effective signal portion. The CP removing section 2031 outputs the CP-removed signal to the FFT section 2032. The FFT section 2032 performs FFT on the CP-removed signal to transform into the signal in the frequency domain. The FFT section 2032 outputs the FFT-processed signal to the subcarrier demapping section 2033. The subcarrier demapping section 2033 extracts the reference signal from the signal in the frequency domain using the resource mapping information. The subcarrier demapping section 2033 outputs the reference signal to the user demultiplexing section 2034.

Figure 7:
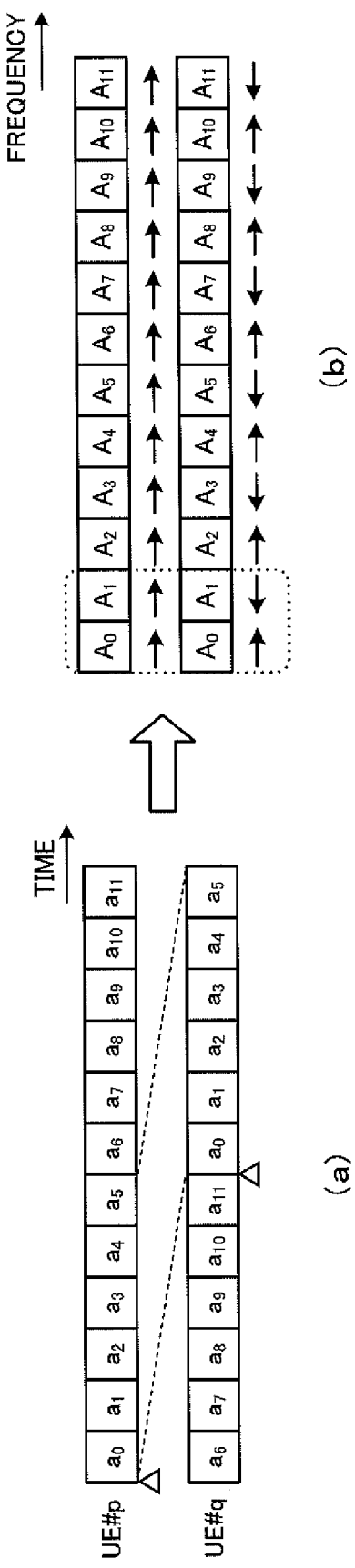
FIGS. 7(a) and 7(b) are diagrams to explain the orthogonally multiplexing method by cyclic shift in the radio base station apparatus according to the Embodiment of the invention.
Figure 8:
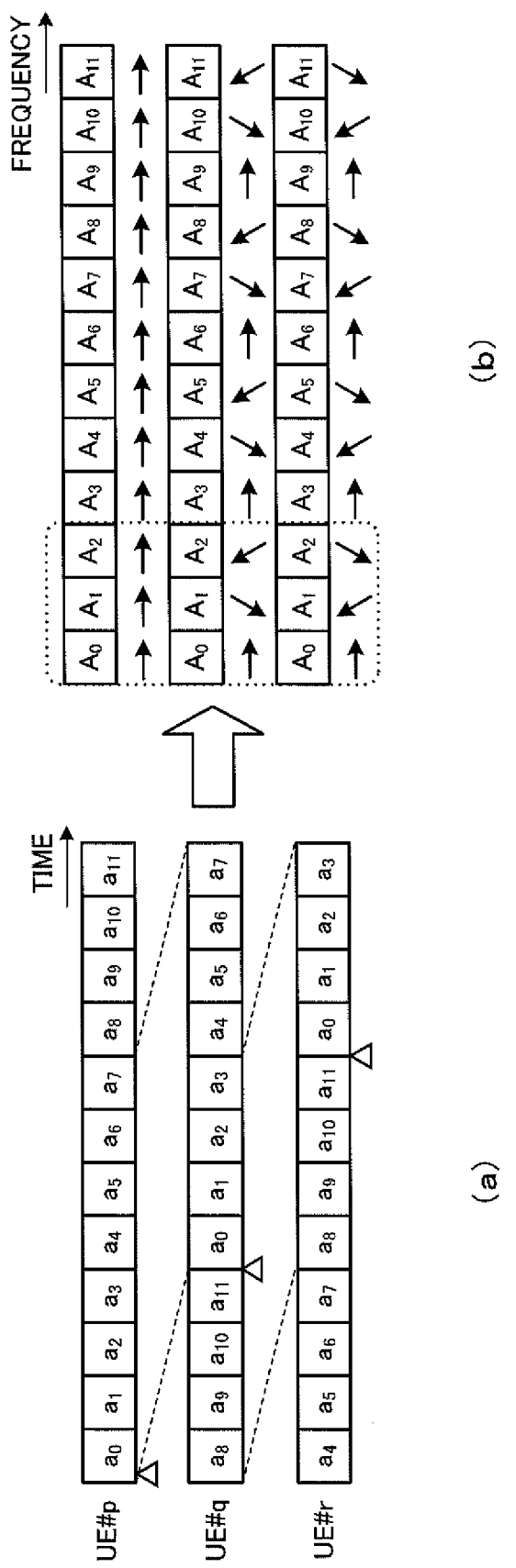
FIGS. 8(a) and 8(b) are diagrams to explain the orthogonally multiplexing method by cyclic shift in the radio base station apparatus according to the Embodiment of the invention.
Figure 9:
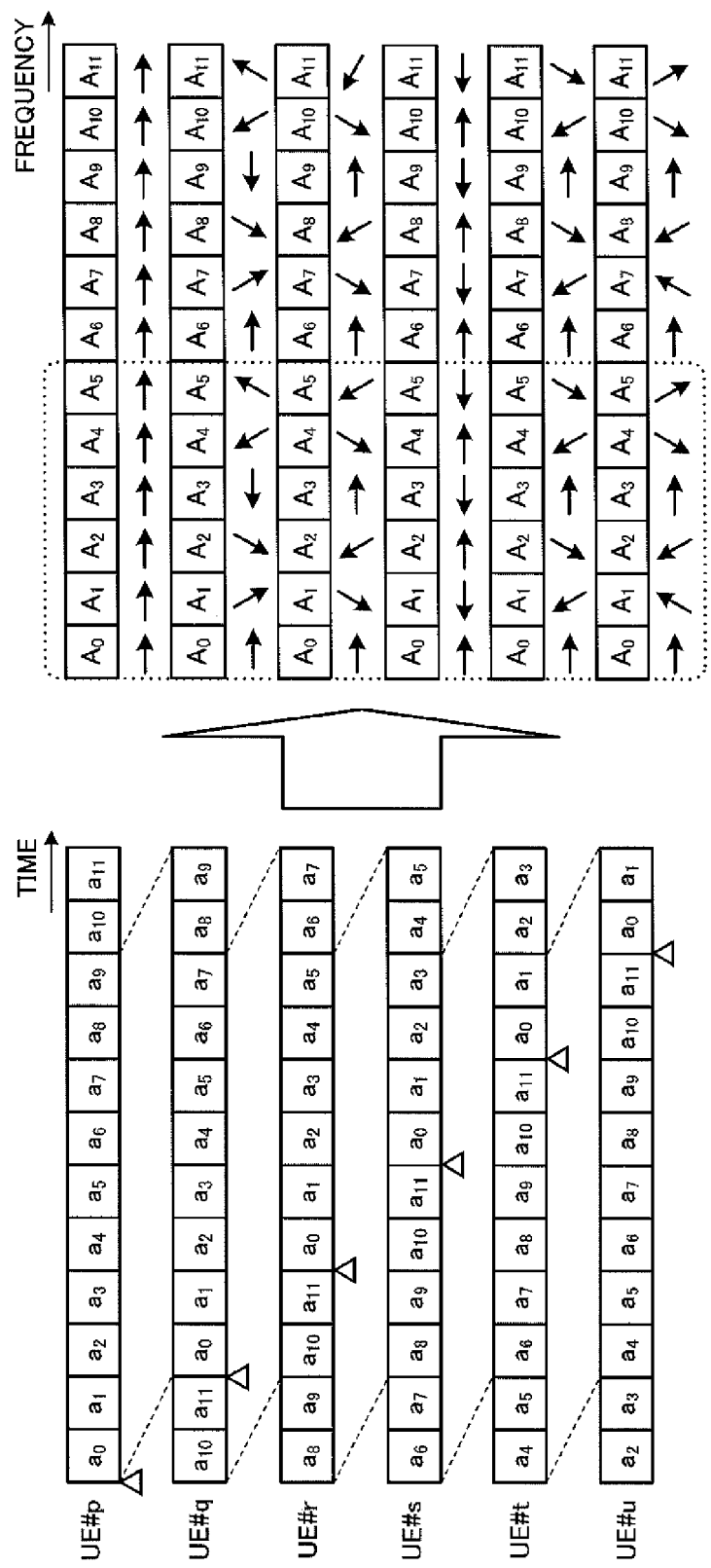
FIGS. 9(a) and 9(b) are diagrams to explain the orthogonally multiplexing method by cyclic shift in the radio base station apparatus according to the Embodiment of the invention.

The user demultiplexing section 2034 performs coherent averaging using the different number of unit subcarriers corresponding to the number of multiplexed users to demultiplex into reference signals for each of users. The user demultiplexing section 2034 demultiplexes into the reference signal for each of users that are orthogonally multiplexed by the cyclic shift using the number of multiplexed users, the sequence number and the cyclic shift number. For example, when the number of multiplexed users is "2", as shown in FIG. 7(*b*), the section 2034 performs coherent averaging over two adjacent subcarriers and performs user demultiplexing on the reference signals. Further, when the number of multiplexed users is "3", as shown in FIG. 8(*b*), the section 2034 performs coherent averaging over three adjacent subcarriers and performs user demultiplexing on the reference signals. Furthermore, when the number of multiplexed users is "4" to "6", as shown in FIG. 9(*b*), the section 2034 performs coherent averaging over six adjacent subcarriers and performs user demultiplexing on the reference signals. The user demultiplexing section 2034 outputs the reference signals subjected to user demultiplexing to the channel estimation section 2035. In this case, the user demultiplexing section 2034 outputs the reference signals to the channel estimation section 2035 for each range (unit subcarriers: for example, dashed-line range in FIGS. 7(*b*), 8(*b*) and 9(*b*)) to perform coherent averaging.

In addition, in the radio base station apparatus, since the number of multiplexed users is known (the radio base station apparatus allocates resources to the mobile terminal apparatuses) in resource blocks (RBs) in some subframe, the mobile terminal apparatus does not need to send signaling or the like on the cyclic shift.

The channel estimation section 2035 performs channel estimation using the sequence number and the reference signal subjected to user demultiplexing. In other words, the section 2035 compares the known subcarrier obtained from the sequence number with the subcarrier of the reference signal subjected to user demultiplexing to estimate the channel variation. In this case, since the section 2035 performs channel estimation for each range (unit subcarriers: for example, dashed-line range in FIGS. 7(*b*), 8(*b*) and 9(*b*)) to perform coherent averaging, even when the channel variation is large in the transmission band, it is possible to reduce the difference between the actual channel variation and the coherent averaging value, and it is possible to enhance channel estimation accuracy. The channel estimation section 2035 outputs the estimated channel variation to the frequency domain equalization section 2045 of the CQI/OMI signal processing section 204.

With respect to the CQI/PMI signal, the CP removing section 2041 in the CQI/PMI signal processing section 204 removes a portion corresponding to the CP from the reception signal, and extracts an effective signal portion. The CP removing section 2041 outputs the CP-removed signal to the FFT section 2042. The FFT section 2042 performs FFT on the CP-removed signal to transform into the signal in the frequency domain. The FFT section 2042 outputs the FFT-processed signal to the subcarrier demapping section 2043. The subcarrier demapping section 2043 extracts the CQI/PMI signal from the signal in the frequency domain using the resource mapping information. The subcarrier demapping section 2043 outputs the CQI/PMI signal to the user demultiplexing section 2044.

The user demultiplexing section 2044 performs coherent averaging using the different number of unit subcarriers corresponding to the number of multiplexed users to demultiplex into CQI/PMI signals for each of users. The user demultiplexing section 2044 demultiplexes into a CQI/PMI signal for each of users that are orthogonally multiplexed by the cyclic shift using the number of multiplexed users, the sequence number and the cyclic shift number. For example, when the number of multiplexed users is "2", as shown in FIG. 7(b), the section 2044 performs coherent averaging over two adjacent subcarriers and performs user demultiplexing on the CQI/PMI signals. Further, when the number of multiplexed users is "3", as shown in FIG. 8(b), the section 2044 performs coherent averaging over three adjacent subcarriers and performs user demultiplexing on the CQI/PMI signals. Furthermore, when the number of multiplexed users is "4" to "6", as shown in FIG. 9(b), the section 2044 performs coherent averaging over six adjacent subcarriers and performs user demultiplexing on the CQI/PMI signals. The user demultiplexing section 2044 outputs the CQI/PMI signals subjected to user demultiplexing to the frequency domain equalization section 2045. In this case, the user demultiplexing section 2044 outputs the CQI/PMI signals to the frequency domain equalization section 2045 for each range (unit subcarriers: for example, dashed-line range in FIGS. 7(b), 8(b) and 9(b)) to perform coherent averaging.

In addition, in the radio base station apparatus, since the number of multiplexed users is known (the radio base station apparatus allocates resources to the mobile terminal apparatuses) in resource blocks (RBs) in some subframe, the mobile terminal apparatus does not need to send signaling or the like on the cyclic shift.

The frequency domain equalization section 2045 compensates the CQI/PMI signal subjected to user demultiplexing for the channel variation estimated in the channel estimation section 2035. The frequency domain equalization section 2045 outputs the equalized CQI/PMI signal to the IDFT section 2046. The IDFT section 2046 transforms the signal in the frequency domain into the signal in the time domain. The IDFT section 2046 outputs the IDFT-processed signal to the data demodulation section 2047. The data demodulation section 2047 performs data demodulation on the CQI/PMI signal to output to the data decoding section 2048. The data decoding section 2048 performs data decoding on the demodulated CQI/PMI signal to output as CQI/PMI information.

Described is the radio communication method according to the invention using the radio base station apparatus and the mobile terminal apparatus having the above-mentioned configurations. In the radio communication method according to the invention, the mobile terminal apparatus provides a plurality of subcarriers with phase rotation amounts set to minimize the number of unit subcarriers for coherent averaging in association with the number of multiplexed users, and transmits an uplink control signal using the plurality of subcarriers provided with the phase rotation amounts, and the radio base station apparatus receives the uplink control signal, performs coherent averaging on reference signals using the different number of unit subcarriers corresponding to the number of multiplexed users to demultiplex into reference signals for each user, and estimates a channel variation received in the propagation path using the demultiplexed reference signals.

First, the OFDM signal generating section 201 in the radio base station apparatus multiplexes the uplink resource allocation information including the sequence number, resource mapping information (including resource block numbers) and the cyclic shift number, and the other downlink channel signals to be an OFDM signal, and the OFDM signal is transmitted as a downlink transmission signal. The mobile terminal apparatus receives the downlink OFDM signal in the OFDM signal demodulation section 104 to demodulate. Then, the BCH signal/downlink control signal decoding section 105 extracts the sequence number, the resource mapping information, and the cyclic shift number, outputs the sequence number to the transmission signal sequence generating sections 1011 and reference signal sequence generating section 1021, outputs the resource mapping information to the subcarrier mapping sections 1016, 1023, and outputs the cyclic shift number to the cyclic shift sections 1012, 1022.

The OFDM signal demodulation section 104 extracts reference signals included in the downlink reception signal to output to the CQI/PMI estimation section 106. The CQI/PMI estimation section 106 performs CQI/PMI estimation using the reference signals to obtain a CQI/PMI bit sequence. The CQI/PMI bit sequence is subjected to error correcting coding in the channel coding section 103, and is subjected to data modulation in the data modulation section 1014.

The cyclic shift section 1012 provides each of a plurality of subcarriers (12 subcarriers in the transmission band of the PUCCH) corresponding to the transmission signal sequence with phase rotation. The phase rotation amount is set to minimize the number of unit subcarriers for coherent averaging in association with the number of multiplexed users. In other words, the cyclic shift section 1012 provides the transmission signal sequence in the frequency domain with a predetermined phase rotation amount as shown in FIGS. 7(b), 8(b), and 9(b).

The block modulation section 1015 performs block modulation on a plurality of subcarriers provided with phase rotation with the data-modulated CQI/PMI signal. The subcarrier mapping section 1016 maps the block-modulated signal based on the resource mapping information. The IFFT section 1017 transforms the subcarrier-mapped signal into the signal in the time domain by IFFT, and the CP adding section 1018 adds the CP to the signal.

Meanwhile, the cyclic shift section 1022 in the reference signal processing section 102 provides each of a plurality of subcarriers (12 subcarriers in the transmission band of the PUCCH) corresponding to the reference signal sequence with phase rotation. The phase rotation amount is set to minimize the number of unit subcarriers for coherent averaging in association with the number of multiplexed users. In other words, the cyclic shift section 1022 provides the transmission signal sequence in the frequency domain with a predetermined phase rotation amount as shown in FIGS. 7(b), 8(b), and 9(b). The subcarrier mapping section 1023 maps the cyclically-shifted signal based on the resource mapping information. The IFFT section 1024 transforms the subcarrier-mapped signal into the signal in the time domain by IFFT, and the CP adding section 1025 adds the CP to the signal.

Thus obtained CQI/PMI signal and reference signal are time-multiplexed, and transmitted to the radio base station apparatus as an uplink transmission signal. The radio base station apparatus receives uplink control channel signals subjected to orthogonal multiplexing among users.

With respect to the reference signal, the CP removing section 2031 removes the CP. Next, the FFT section 2032 performs FFT on the CP-removed signal to be the signal in the frequency domain, and the subcarrier demapping section 2033 demaps from the subcarriers based on the resource mapping information. The user demultiplexing section 2034 demultiplexes the demapped reference signal into reference signals for each user. At this point, coherent averaging is performed by minimizing the number of unit subcarriers for coherent averaging corresponding to the number of multiplexed users. Then, the reference signals are output to the channel estimation section 2035 for each range (unit subcarriers: for example, dashed-line range in FIGS. 7(*b*), 8(*b*) and 9(*b*)) to perform coherent averaging. As shown in FIG. 6, since the channel estimation section 2035 performs channel estimation using a result of coherent averaging over the minimum number of unit subcarriers in association with the number of multiplexed users, even when the channel variation is large in the transmission band, it is possible to reduce the difference between the actual channel variation and the coherent averaging value, and it is possible to enhance channel estimation accuracy.

With respect to the CQI/PMI signal, the CP removing section 2041 removes the CP. Next, the FFT section 2042 performs FFT on the CP-removed signal to be the signal in the frequency domain, and the subcarrier demapping section 2043 demaps from the subcarriers based on the resource mapping information. The user demultiplexing section 2044 demultiplexes the demapped CQI/PMI signal into reference signals for each user. At this point, coherent averaging is performed by minimizing the number of unit subcarriers for coherent averaging corresponding to the number of multiplexed users. In this case, as shown in FIG. 6, since coherent averaging is performed over the minimum number of unit subcarriers in association with the number of multiplexed users, it is possible to prevent increases in remaining interference that remains in demultiplexing a user-multiplexed signal. By this means, it is possible to maintain orthogonality in orthogonalization between users at a high degree.

Next, the frequency domain equalization section 2045 compensates the CQI/PMI signal for the channel variation estimated in the channel estimation section 2035. The IDFT section 2046 performs IDFT on the CQI/PMI signal compensated for the channel variation to transform into the signal in the time domain. Next, the data demodulation section 2046 performs data demodulation on the IDFT-processed signal, and then, the data decoding section 2048 performs decoding and obtains CQI/PMI information. The radio base station apparatus performs scheduling and adaptive radio link control using the obtained CQI information, while performing control of MIMO transmission using the PMI information.

In this way, in the invention, corresponding to the number of multiplexed users, the reception side adaptively changes the number of subcarriers to perform coherent averaging for user demultiplexing to a required minimum number, and therefore, particularly, in an environment with large delay spread (the channel variation due to the propagation path is large within the transmission frequency band), it is possible to achieve improvements in channel estimation accuracy and reductions in inter-user interference.

The present invention is not limited to the above-mentioned Embodiment, and is capable of being carried into practice with various modifications thereof. The above-mentioned Embodiment describes the case where the feedback control information is a CQI/PMI signal, but the invention is not limited thereto, and is similarly applicable to the case where the feedback control information is all feedback control information, which is transmitted on the PUCCH using the cyclic shift, used in the LTE-Advanced system evolved from LTE. Further, the above-mentioned Embodiment describes the case where the number of subcarriers in the transmission band is "12", but the invention is not limited thereto, and is applicable to the case where the number of subcarriers in the transmission band is any number other than "12".

Further, without departing from the scope of the invention, the number of processing sections and processing procedures in the above-mentioned description are capable of being carried into practice with modifications thereof as appropriate. Furthermore, each element shown in the figures represents the function, and each function block may be actualized by hardware or may be actualized by software. Moreover, the invention is capable of being carried into practice with modifications thereof as appropriate without departing from the scope of the invention.

The present application is based on Japanese Patent Application No. 2009-178512 filed on Jul. 31, 2009, entire content of which is expressly incorporated by reference herein.

The invention claimed is:

1. A radio base station apparatus comprising:
a reception section configured to receive an uplink control signal including a reference signal and feedback control information transmitted with subcarriers to which phase rotation amounts are added;
a first user demultiplexing section configured to perform coherent averaging on the reference signal using the different number of unit subcarriers corresponding to the number of multiplexed users to demultiplex into a reference signal for each of the users; and
a channel estimation section configured to estimate a channel variation using the demultiplexed reference signal,
wherein the phase rotation amounts are set to minimize the number of unit subcarriers for coherent averaging in association with the number of multiplexed users.

2. The radio base station apparatus according to claim 1, further comprising:
a second user demultiplexing section configured to perform coherent averaging on the feedback control information using the different number of subcarriers corresponding to the number of multiplexed users to demultiplex into feedback control information for each of the users; and
an equalization section configured to compensate the demultiplexed feedback control information for the channel variation.

3. The radio base station apparatus according to claim 2, wherein when the number of multiplexed users is "2", the number of unit subcarriers for coherent averaging is "2", and the first user demultiplexing section and/or the second user demultiplexing section is configured to perform coherent averaging over two adjacent subcarriers.

4. The radio base station apparatus according to claim 2, wherein when the number of multiplexed users is "3", the number of unit subcarriers for coherent averaging is "3", and the first user demultiplexing section and/or the second user demultiplexing section is configured to perform coherent averaging over three adjacent subcarriers.

5. The radio base station apparatus according to claim 2, wherein when the number of multiplexed users is "4" to "6", the number of unit subcarriers for coherent averaging is "6", and the first user demultiplexing section and/or the second user demultiplexing section is configured to perform coherent averaging over six adjacent subcarriers.

6. The radio base station apparatus according to claim 5, wherein the first user demultiplexing section is configured to change positions of six adjacent subcarriers to perform coherent averaging over a plurality of times.

7. A mobile terminal apparatus comprising:
a cyclic shift section configured to add phase rotation amounts to a plurality of subcarriers; and
a transmission section configured to transmit to a radio base station an uplink control signal including a reference signal using the plurality of subcarriers to which the phase rotation amounts are added,
wherein the phase rotation amounts are set to minimize the number of unit subcarriers for coherent averaging in association with the number of multiplexed users; and
wherein the radio base station performs coherent averaging on the reference signal using the different number of unit subcarriers corresponding to the number of multiplexed users to demultiplex into a reference signal for each of the users.

8. The mobile terminal apparatus according to claim 7, wherein when the number of multiplexed users is "2", the number of unit subcarriers for coherent averaging is "2", and the phase rotation amounts to add to the subcarriers are set so that a radio base station apparatus is capable of performing user demultiplexing by performing coherent averaging over two subcarriers.

9. The mobile terminal apparatus according to claim 7, wherein when the number of multiplexed users is "3", the number of unit subcarriers for coherent averaging is "3", and the phase rotation amounts to add to the subcarriers are set so that a radio base station apparatus is capable of performing user demultiplexing by performing coherent averaging over three subcarriers.

10. The mobile terminal apparatus according to claim 7, wherein when the number of multiplexed users is "4" to "6", the number of unit subcarriers for coherent averaging is "6", and the phase rotation amounts to add to the subcarriers are set so that a radio base station apparatus is capable of performing user demultiplexing by performing coherent averaging over six subcarriers.

11. A radio communication method comprising:
in a mobile terminal apparatus, adding phase rotation amounts to a plurality of subcarriers;
transmitting an uplink control signal including a reference signal and feedback control information using the plurality of subcarriers to which the phase rotation amounts are added;
in a radio base station apparatus, receiving the uplink control signal;
performing coherent averaging on the reference signal using the different number of unit subcarriers corresponding to the number of multiplexed users to demultiplex into a reference signal for each of the users; and
estimating a channel variation using the demultiplexed reference signal,
wherein the phase rotation amounts are set to minimize the number of unit subcarriers for coherent averaging in association with the number of multiplexed users.

12. The radio communication method according to claim 11, further comprising:
performing coherent averaging on the feedback control information using the different number of subcarriers corresponding to the number of multiplexed users to demultiplex into feedback control information for each of the users; and
compensating the demultiplexed feedback control information for the channel variation.

* * * * *